United States Patent
Chow et al.

(10) Patent No.: US 7,352,372 B2
(45) Date of Patent: Apr. 1, 2008

(54) INDIRECT ADDRESSING MODE FOR DISPLAY CONTROLLER

(75) Inventors: Raymond Chow, Richmond (CA); Jimmy Kwok Lap Lai, Vancouver (CA)

(73) Assignee: Seiko Epson Corporation, Tokyo (JP)

( * ) Notice: Subject to any disclaimer, the term of this patent is extended or adjusted under 35 U.S.C. 154(b) by 609 days.

(21) Appl. No.: 10/972,020

(22) Filed: Oct. 22, 2004

(65) Prior Publication Data

US 2006/0090018 A1    Apr. 27, 2006

(51) Int. Cl.
- G06F 13/28   (2006.01)
- G06F 15/00   (2006.01)
- G06F 12/00   (2006.01)
- G06T 1/00    (2006.01)
- G06F 3/00    (2006.01)
- G06F 5/00    (2006.01)

(52) U.S. Cl. .......................... 345/564; 710/22; 710/51; 345/501

(58) Field of Classification Search .................. 710/51
See application file for complete search history.

(56) References Cited

U.S. PATENT DOCUMENTS

| 4,342,991 A | 8/1982 | Pope et al. |
| 4,481,570 A | 11/1984 | Wiker |
| 4,758,881 A | 7/1988 | Laspada |
| 6,195,734 B1 | 2/2001 | Porterfield |
| 6,593,932 B2 | 7/2003 | Porterfield |
| 7,068,253 B2 * | 6/2006 | Kudo et al. .................. 345/99 |
| 2002/0030685 A1 | 3/2002 | Brethour et al. |

FOREIGN PATENT DOCUMENTS

| EP | 0 917 048 A3 | 8/2000 |
| JP | 62-151955 | 7/1987 |
| JP | 3-185536 | 8/1991 |

* cited by examiner

Primary Examiner—Alford Kindred
Assistant Examiner—Brooke J Dews
(74) Attorney, Agent, or Firm—Mark P. Watson

(57) ABSTRACT

A display controller is provided. The display controller is configured to provide an indirect addressing mode to access a memory location within the display controller. The display controller includes a first pin configured to enable access to one of a register of the display controller or a memory region of the display controller based upon a logical level of a first signal received by the first pin. A second pin is included. The second pin is configured to define the access to the register or the memory region as one of address information or data based upon a logical level of a second signal received by the second pin. The display controller includes an extra pin mode module configured to enable the first signal to select the data to access memory without accessing a register block. A device and methods for implementing an indirect addressing mode is also provided.

10 Claims, 8 Drawing Sheets

INDIRECT ADDRESSING MODE FOR DISPLAY CONTROLLER

CROSS REFERENCE TO RELATED APPLICATIONS

This application is related to U.S. patent application Ser. No. 10/802,978, filed on Mar. 17, 2004, entitled "Dual Function Busy Pin," which is incorporated herein by reference in its entirety for all purposes.

BACKGROUND

1. Field of the Invention

This invention relates generally to computer systems and more particularly to a method and apparatus for refreshing a display panel.

2. Description of the Related Art

Display controllers typically support an indirect addressing mode for a host interface. This indirect addressing mode typically requires a read/write strobe signal, chip select signal, register select signal, and a data bus. An indirect interface offers the advantage of a low pin count in exchange for a decrease in performance. The indirect interface typically requires two accesses to write to a register location, 1) an index cycle and 2) a data cycle. The index cycle sets up an address pointer to the register to be accessed, while the data cycle reads from or writes data to that specified register.

Thus, the internal memory of the display controller is not directly accessible as the access is through registers, e.g., memory address registers (which depending on the bus width can be several) and memory data registers. Accessing non-consecutive areas of memory results in decreased throughput because non-consecutive accesses require an index and data cycle to the memory address register and the memory data register. For example, to access memory location 0000 h in a typical 16-bit addressable 8-bit wide indirect interface requires 9 bus cycles (6 index cycles and 3 data cycles) to setup the memory address pointer, and then 3 bus cycles (2 index and 1 data cycle) to read/write data to the memory location. Thus, if memory is to be accessed in non-sequential fashion, each memory access requires 12 cycles per memory access.

As a result, there is a need to solve the problems of the prior art to provide an apparatus and method to more efficiently access memory under an indirect addressing scheme.

SUMMARY

Broadly speaking, the present invention fills these needs by providing a method and apparatus for implementing an indirect addressing scheme. It should be appreciated that the present invention can be implemented in numerous ways, including as a method, a system, or a device. Several inventive embodiments of the present invention are described below.

In one embodiment, a method for implementing an indirect addressing mode to access memory of a graphics processing unit (GPU) is provided. The method initiates with receiving a first signal through a first pin of the GPU. The first signal is configured to indicate the selection of the GPU. A second signal is then received through a second pin of the GPU. The second signal is configured to indicate a memory access request for a memory region of the GPU. The method includes toggling a third signal communicated through a third pin between a first state and a second state. The first state represents address information being sent for the memory access and the second state represents data being sent for the memory access.

In another embodiment, a display controller is provided. The display controller is configured to provide an indirect addressing mode to access a memory location within the display controller. The display controller includes a first pin configured to enable access to one of a register of the display controller or a memory region of the display controller based upon a logical level of a first signal received by the first pin. A second pin is included. The second pin is configured to define the access to the register or the memory region as one of address information or data based upon a logical level of a second signal received by the second pin. The display controller includes an extra pin mode module configured to enable the first signal to select the data to access memory without accessing a register block.

In yet another embodiment, a device capable of displaying image data is provided. The device includes a central processing unit (CPU) and a display controller in communication with the CPU. The display controller is configured to provide an indirect addressing mode to access a memory location within the display controller. The display controller includes a first pin configured to enable access to one of a register of the display controller or a memory region of the display controller based upon a logical level of a first signal received by the first pin. A second pin is included. The second pin is configured to define the access to the register or the memory region as one of address information or data based upon a logical level of a second signal received by the second pin. The display controller includes an extra pin mode module configured to enable the first signal to select the data to access memory without accessing a register block.

In still yet another embodiment, a method for an indirect addressing scheme for a host interface to access an external device is provided. The method initiates with receiving first and second signals through corresponding first and second pins of the external device. The first and second signals are transmitted from the host interface. The method includes determining if the access is one of an address or data access. If the access is a data access, then the method includes directing the data access to one of a register block or a memory region of the external device based on corresponding states of the first and second signals. If the access is an address access, then the method includes updating an internal address pointer within the register block.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION

An invention is described for method and device that supports an indirect addressing mode for a host interface. It will be obvious, however, to one skilled in the art, that the present invention may be practiced without some or all of these specific details. In other instances, well known process operations have not been described in detail in order not to unnecessarily obscure the present invention.

The embodiments of the present invention provide a method and device that enables a reduction in the amount of bus cycles required to access an internal memory of a display controller through an indirect addressing scheme. The feature, described in more detail below, allows memory accesses to have similar performance to register accesses. This feature is enabled by adding 1 extra pin to the indirect interface. Alternatively, an unused pin, i.e., one that is not allocated when the chip is configured in indirect mode, may be utilized as the extra pin. This pin may be configured to operate in 2 alternative modes: 1) an active low memory chip select (MEMCS#) or 2) a Register/Memory strobe signal (R/M#). The extra pin would be optional to allow for backward compatibility by having an internal pull-up resistor. Therefore, the pin could be left unconnected (floating) and the memory may still be accessed indirectly through registers under a conventional indirect addressing scheme.

Figure 1:
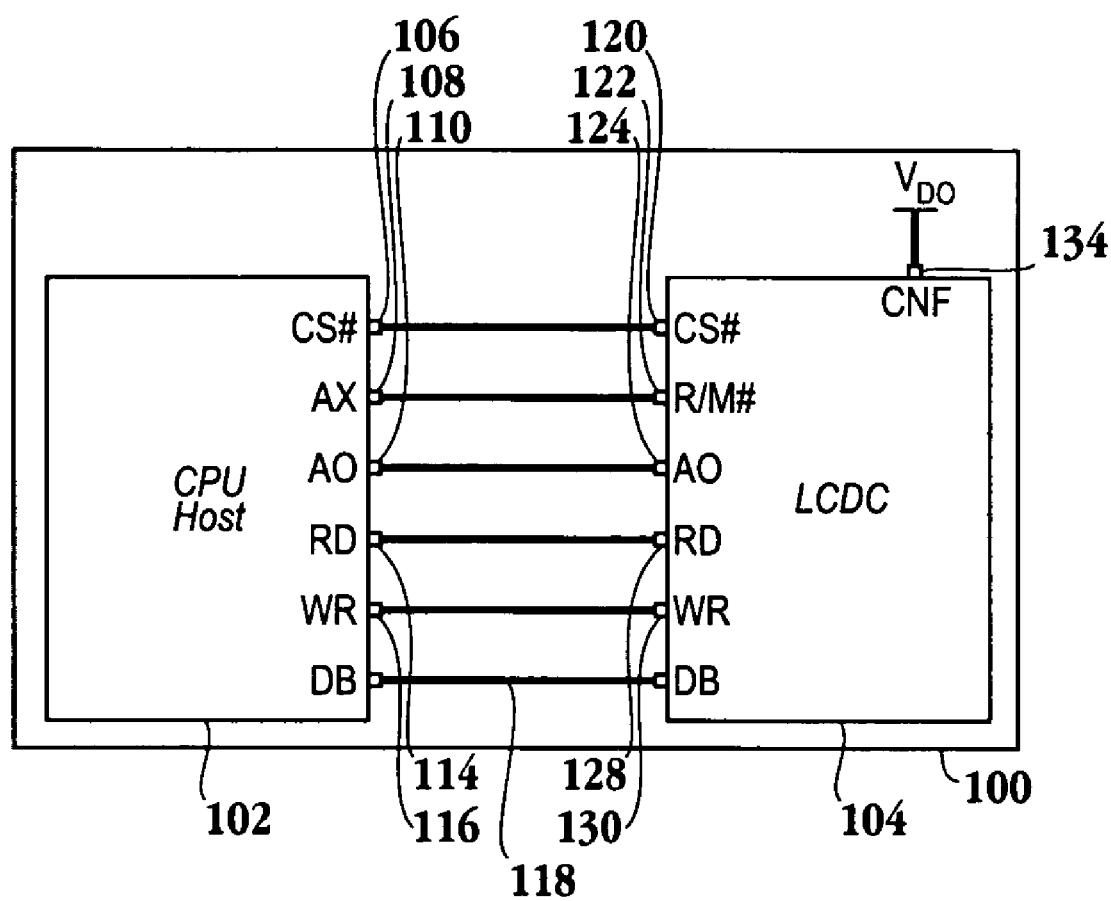
FIG. 1 is a simplified schematic diagram of a device having a pin configuration for supporting an indirect addressing mode between a host controller and a display controller in accordance with one embodiment of the invention.

FIG. 1 is a simplified schematic diagram of a device having a pin configuration for supporting an indirect addressing mode between a host controller and a display controller in accordance with one embodiment of the invention. Here, device 100 includes central processing unit 102 and display controller 104. In one embodiment, display controller 104 is a liquid crystal display controller. Central processing unit 102 includes pins 106, 108, 110, 114, 116 and 118. Pin 106 is configured to support a chip select (CS#) signal. Pin 108 is an auxiliary pin, which may or may not be necessary to allow for odd/even-byte/word accesses if needed. For example, for a 16 bit wide device, an extra auxiliary (AX) line may be used to access high or low bytes. Pin 110 is used to transmit and receive address data. Pin 114 is configured to support a read signal, while pin 116 is configured to support a write enable signal. Data bus 118 enables data transmission between central processing unit 102 and display controller 104. Display controller 104 includes pins 120, 122, 124, 128, and 130. The width of data bus 118 may be any suitable bit size, e.g., 8 bits, 16 bits, 32 bits, etc. Pin 120 is configured to communicate with pin 106 of central processing unit 102 to support the chip select signal. Pin 122 is configured to communicate with auxiliary pin 108 and a register/memory strobe signal (R/M#) is communicated between pin 122 and pin 108. Pin A0 124 is in communication with pin 110 for the transmission of address information or data. Typically, pin A0 124 is used internally by decode logic to discriminate between the two types of bus accesses, i.e., index (register address) or data (register data). Alternatively, depending on the protocol, the two types of bus accesses may be referred to as command data or parameter data.

Continuing with FIG. 1, pin 128 communicates a read signal, while pin 130 communicates a write signal. Configuration pin 134 is used to specify the behavior of the extra pin, i.e., R/M# pin 122 or the memory chip select pin of FIG. 2. Alternatively, the behavior of the extra pin may be specified through a register bit. In one embodiment, a designer would set configuration pin 134 at design time to be pulled HIGH or LOW depending on how the designer wishes to use pin 122 of FIG. 1 or pin 142 of FIG. 2. For the R/M# mode of FIG. 1, the designer would run an extra address line signal (AX) to pin 122. In one embodiment, the designer could attach a signal from a general purpose input/output GPIO pin from the CPU and control this pin using software. In this embodiment, software would drive the GPIO pin, thus either mode depicted in FIGS. 1 or 2 may be controlled through the software. Further information on the GPIO pin may be found in application Ser. No. 10/802, 978 which has been incorporated by reference.

Figure 2:
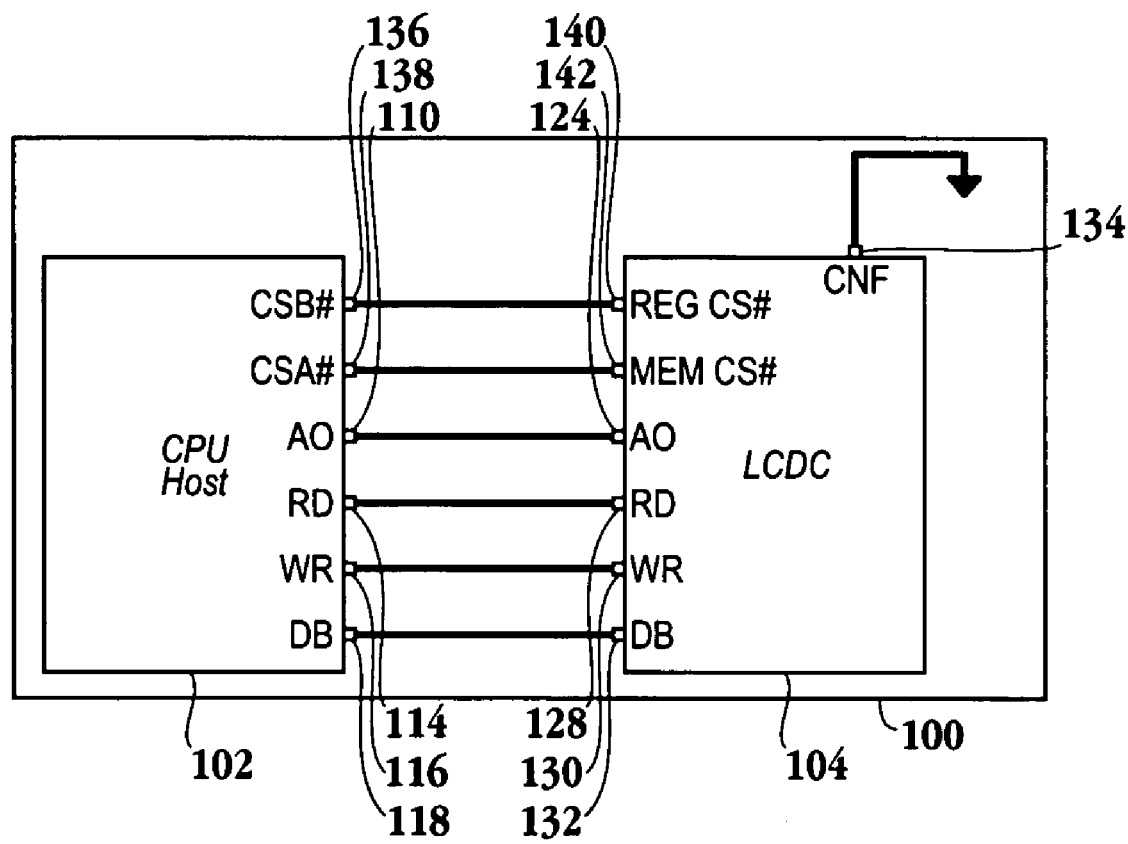
FIG. 2 is an alternative configuration for providing an extra pin in order to support a more efficient indirect addressing scheme in accordance with one embodiment of the invention.

FIG. 2 is an alternative configuration for providing an extra pin in order to support a more efficient indirect addressing scheme in accordance with one embodiment of the invention. Here, CPU 102 includes pins 110, 114, 116, and 118 as described with reference to FIG. 1. In addition, CPU 102 includes pins 136 and 138 configured to accommodate a chip select A signal and a chip select B signal. Display controller 104 includes pins 124, 128, 130 and 132 as described with reference to FIG. 1. Display controller 104 also includes pin 140, accommodating a register chip select signal and pin 142, which accommodates a memory chip select signal. Configuration pin 134 is used to specify the behavior for pins 140 and 142. It should be appreciated that configuration pin 134 is designed to be tied low in FIG. 2, as opposed to being designed to be tied high in FIG. 1.

For the MEMCS# mode of FIG. 2, the designer would attach an extra chip select signal (CSA#) from CPU 102 through configuration pin 134, as opposed to running the extra address line signal to the extra pin in FIG. 1. In the case of a register bit option being used to specify the behavior of pin 142 (the extra pin), where adding a configuration pin to the chip package is not preferred due to size, a configuration register bit enables this function. It should be appreciated that since this additional memory access feature still allows for backward compatibility with the existing register access method, the CPU sets the bit accordingly before attempting any memory accesses upon reset.

Figure 3:
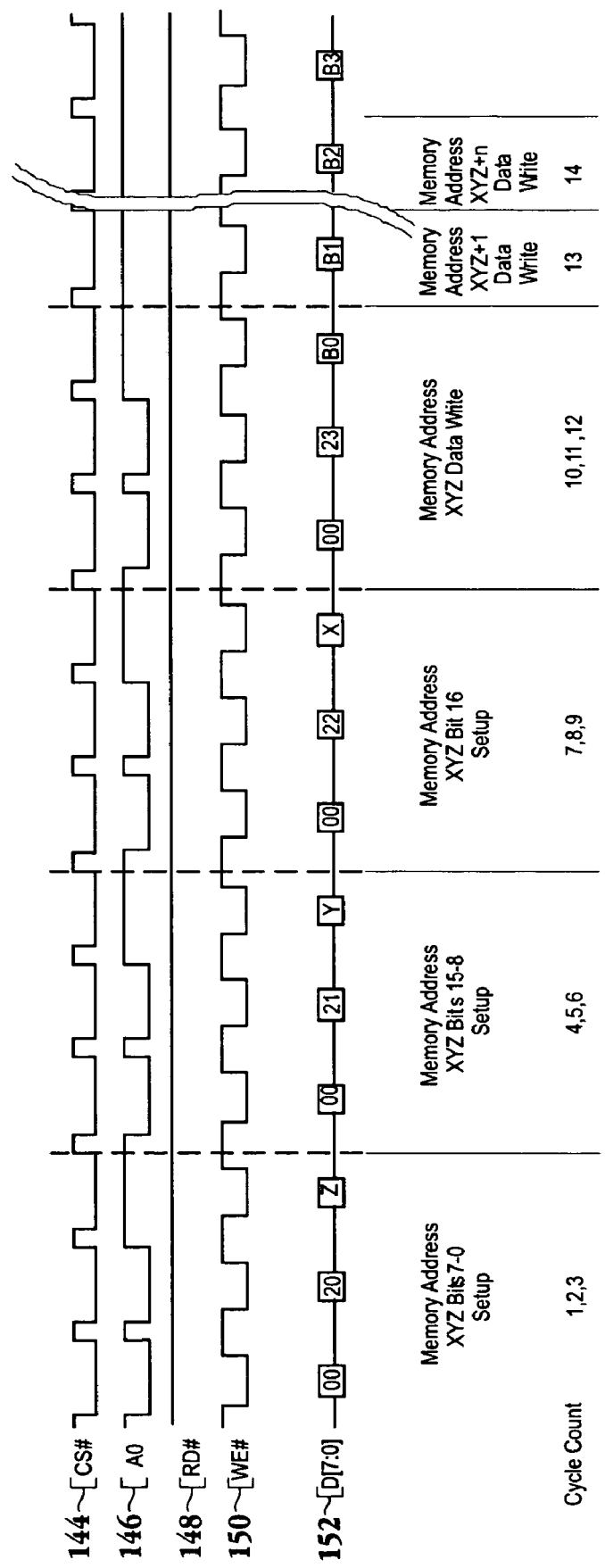
FIG. 3 represents a wave form diagram for the various signals for an indirect addressing scheme.

FIG. 3 represents a wave form diagram for the various signals for an indirect addressing scheme. Signal 144 represents a chip select signal, while signal 146 represents a register select signal. Signals 148 and 150 are representative of a read signal and a write enable signal. Signal 152 represents data being sent on the data bus. As illustrated in FIG. 3, there are nine cycles required to set up the memory address prior to being able to write to the memory address or read from the memory address. Thus, FIG. 3 is an example of a memory write access to memory location "XYZ" with byte B0 followed by a burst of bytes B1, B2, B3. Here, chip select signal 144 is used to set up the address location in registers being accessed. Thus, in the first two cycles for chip select signal 144, where the signal is driven low, access to register 0020 is set up. Then, in the third cycle, as the register select signal 146 is driven high, the data (Z) is placed into register 0020, where the data represents the memory address trying to be accessed. As can be seen, this is repeated for registers 0021 and 0022 during cycle counts 4-9. Once cycles 1 through 9 are completed, then the memory address represented by "XYZ" may be written to with byte B0 as illustrated in cycles 10, 11 and 12.

Figure 4:
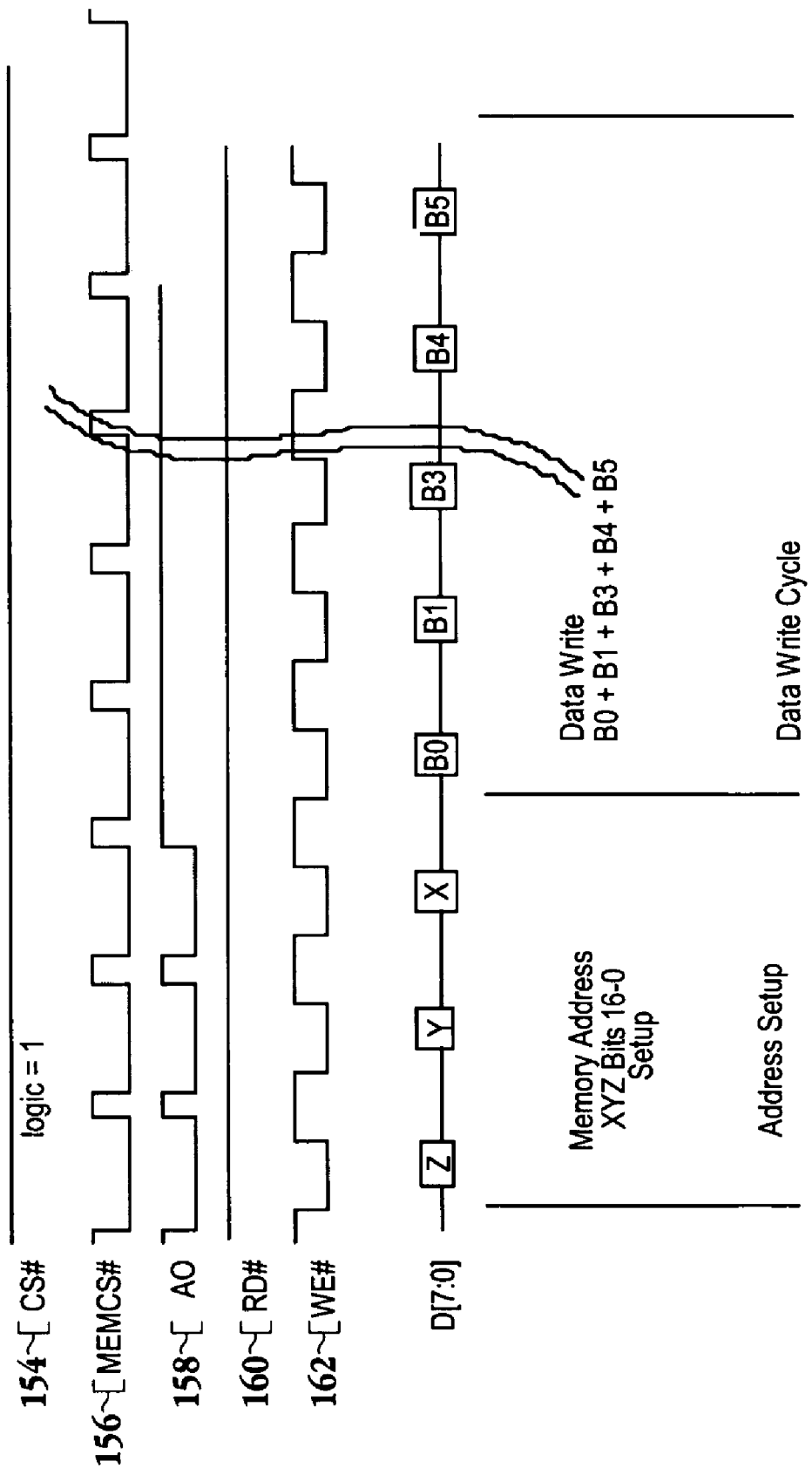
FIG. 4 is a wave form diagram illustrating the signals being used in order to more efficiently accomplish an indirect addressing scheme in accordance with one embodiment of the invention.

FIG. 4 is a wave form diagram illustrating the signals being used in order to more efficiently accomplish an indirect addressing scheme in accordance with one embodiment of the invention. Signal 154 represents the chip select signal, while signal 156 represents the memory chip select signal. Chip select signal 154 is active low in this embodiment. When chip select signal 154 is driven low then this would indicate a register access. Of course, if chip select signal 154 is driven low, then memory chip select signal would be driven high so that both signal 154 and 156 are not active. It should be appreciated that the embodiment of FIG. 4 correlates to the pin designation of FIG. 2, i.e., use of the memory chip select signal. In this case, A0 pin 124 of FIG. 2 functions as an Address/Data Select (or Index/Data select). That is, pin 124 is used for both memory and register accesses to indicate if the current access is to setup an address or if data is to be read from/written to memory.

Returning to FIG. 4, register select signal 158, read enable signal 160, and write enable signal 162 are also included. It should be appreciated that the extra pin, over which memory chip select signal (MEMCS#) 156 is communicated, allows for a reduction in the amount of cycles when compared to the indirect addressing scheme represented by FIG. 3. As a result of the extra pin and utilization of memory chip select signal 156, the memory address set up is achieved in three cycles as opposed to nine cycles required in FIG. 3. Here, the address information is cycled in with register select signal 158 (A0) set low. Register select signal 158 is driven high to drive in the data to the appropriate memory address. It should be further appreciated that the extra pin is utilized to indicate to the display controller that a memory access is occurring, as opposed to indirectly accessing memory by accessing designated register ports by way of register accesses as shown in FIG. 3. It should be noted that while signals 154 and 156 are illustrated in FIG. 4 as being active when low, e.g., a logical value of 0, theses signals may also be configured to active when high, e.g., a logical value of 1.

Figure 5:
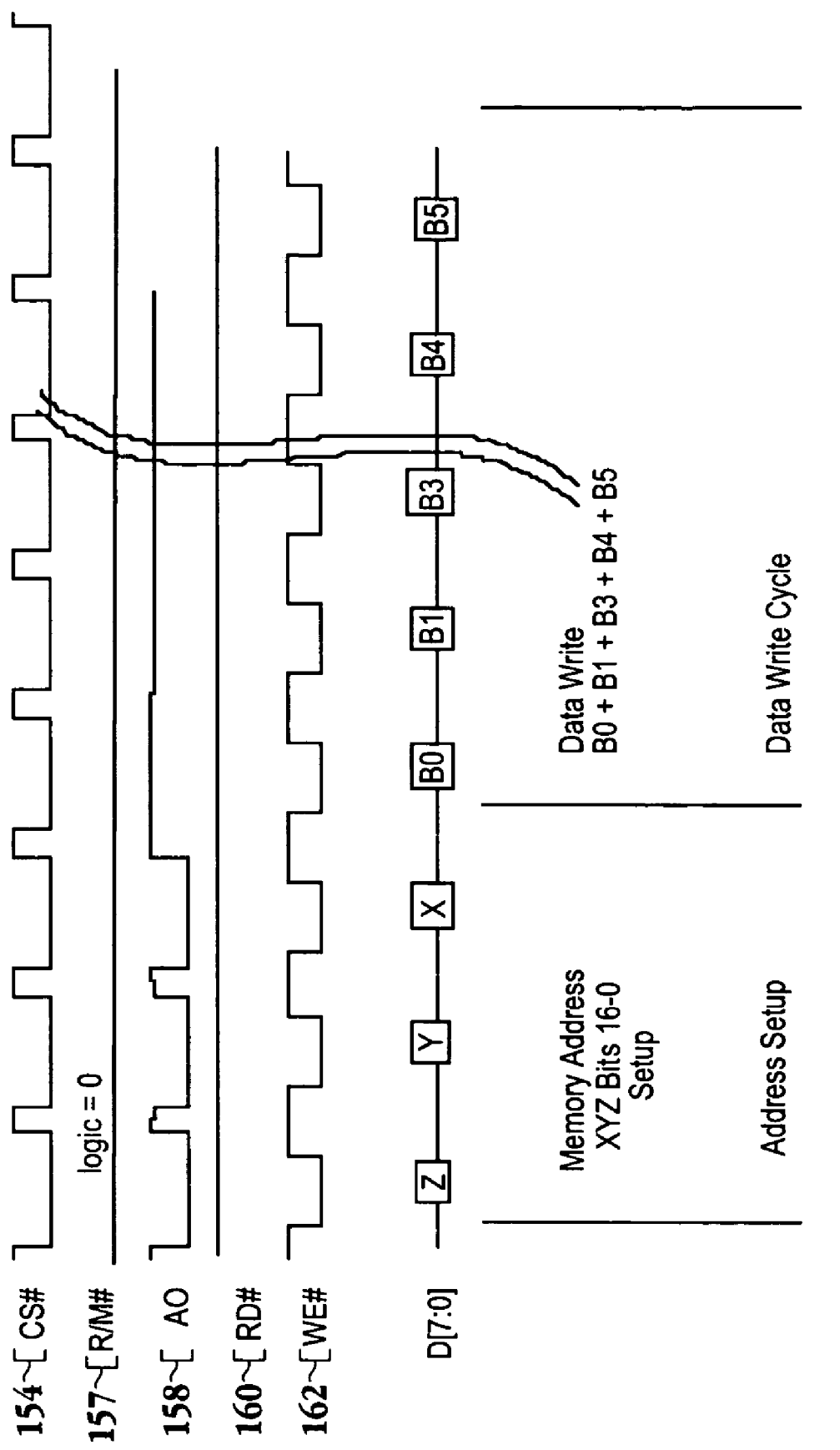
FIG. 5 is a wave form diagram illustrating an alternative signaling scheme to the indirect addressing scheme of FIG. 4.

FIG. 5 is a wave form diagram illustrating an alternative signaling scheme to the indirect addressing scheme of FIG. 4. Signal 154 represents the chip select signal, while signal 157 represents the register memory strobe (R/M#) signal, which are both configured to be active when low. It should be appreciated that the embodiment of FIG. 4 correlates to the pin designation of FIG. 1. In this case, the signal communicated through A0 pin 124 of FIG. 1 functions as an Address/Data Select (or Index/Data select). Pin 124 is used for both memory and register accesses to indicate if the current access is to setup an address or if data is to be read from/written to memory.

Returning to FIG. 5, signal 158, read enable signal 160, and write enable signal 162 are also included. It should be appreciated that the extra pin, over which R/M# 157 is communicated, allows for a reduction in the amount of cycles when compared to the indirect addressing scheme represented by FIG. 3. As a result of the extra pin and utilization of register memory strobe signal 157, the memory address set up is achieved in three cycles similar to FIG. 4, as opposed to the nine cycles required in FIG. 3. Here, the address information is cycled in with register select signal 158 (A0) set low. Register memory strobe signal 157 is driven low to signal a memory access. It should be further appreciated that the extra pin is utilized to indicate to the display controller that a memory access is occurring, as opposed to indirectly accessing memory by accessing designated register ports by way of register accesses as shown in FIG. 3.

Figure 6:
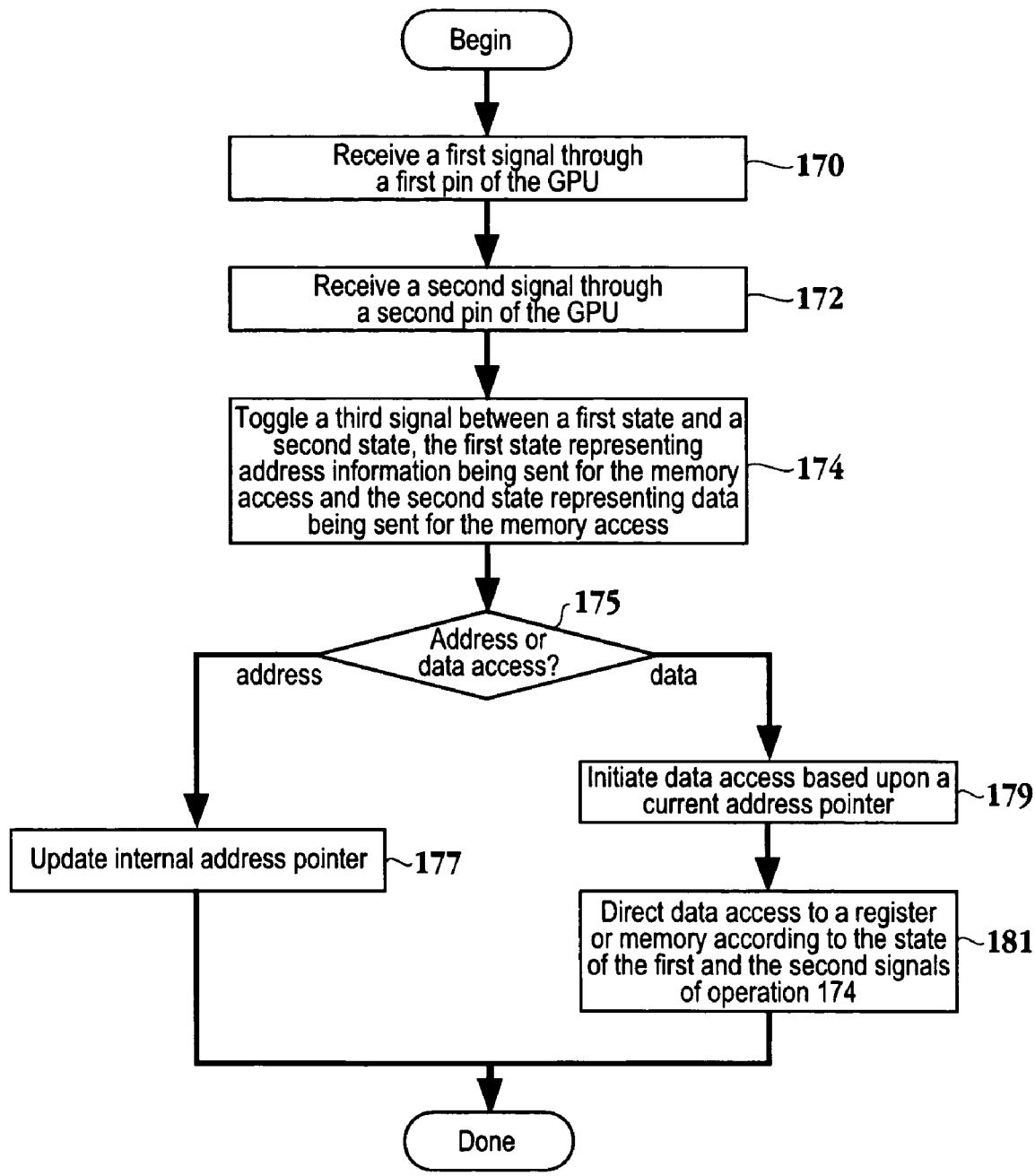
FIG. 6 is a flow chart diagram of the method operations for implementing an indirect addressing mode to access memory of a graphics processing unit in accordance with one embodiment of the invention.

FIG. 6 is a flow chart diagram of the method operations for implementing an indirect addressing mode to access memory of a graphics processing unit in accordance with one embodiment of the invention. It should be noted that the terms "GPU" and "display controller" are interchangeable as used herein. The method initiates with operation 170 where a first signal is received through a first pin of the GPU. The first signal indicates selection of the GPU, i.e., a chip select signal. The method then advances to operation 172 where a second signal is received through a second pin of the GPU. The second signal indicates a memory access request for a memory region of the GPU. For example, a second signal may be the register memory strobe signal (R/M#) discussed above with reference to FIG. 5. The method then proceeds to operation 174 where a third signal communicated through a third pin is toggled between a first state and a second state. Here, the first state represents address information being sent for the memory access and the second state represents data being sent for the memory access. Thus, the third signal is the register select signal of FIG. 5, in one embodiment.

The method of FIG. 6, then proceeds to operation 175 where a selection between an address or data access is made through a third signal that is received through a third pin. The third signal is the A0 signal of FIG. 4 and toggles between an active high and an active low state to indicate address or data access, in one embodiment. If the third signal is at a state indicating an address access, then the method proceeds to operation 177 where an internal address pointer is updated. If the third signal is data then the method moves to operation 179 where a data access is initiated based upon a current address pointer. In operation 181, the data access is directed to either a register or memory based upon the state of the first and the second signals of operation 174. For example, if the chip select signal is active, then the data is directed to a register. If the register memory strobe signal is active, then the data is directed to memory. It should be appreciated that the chip select signal and the register memory strobe signal are not active at the same time.

Figure 7:
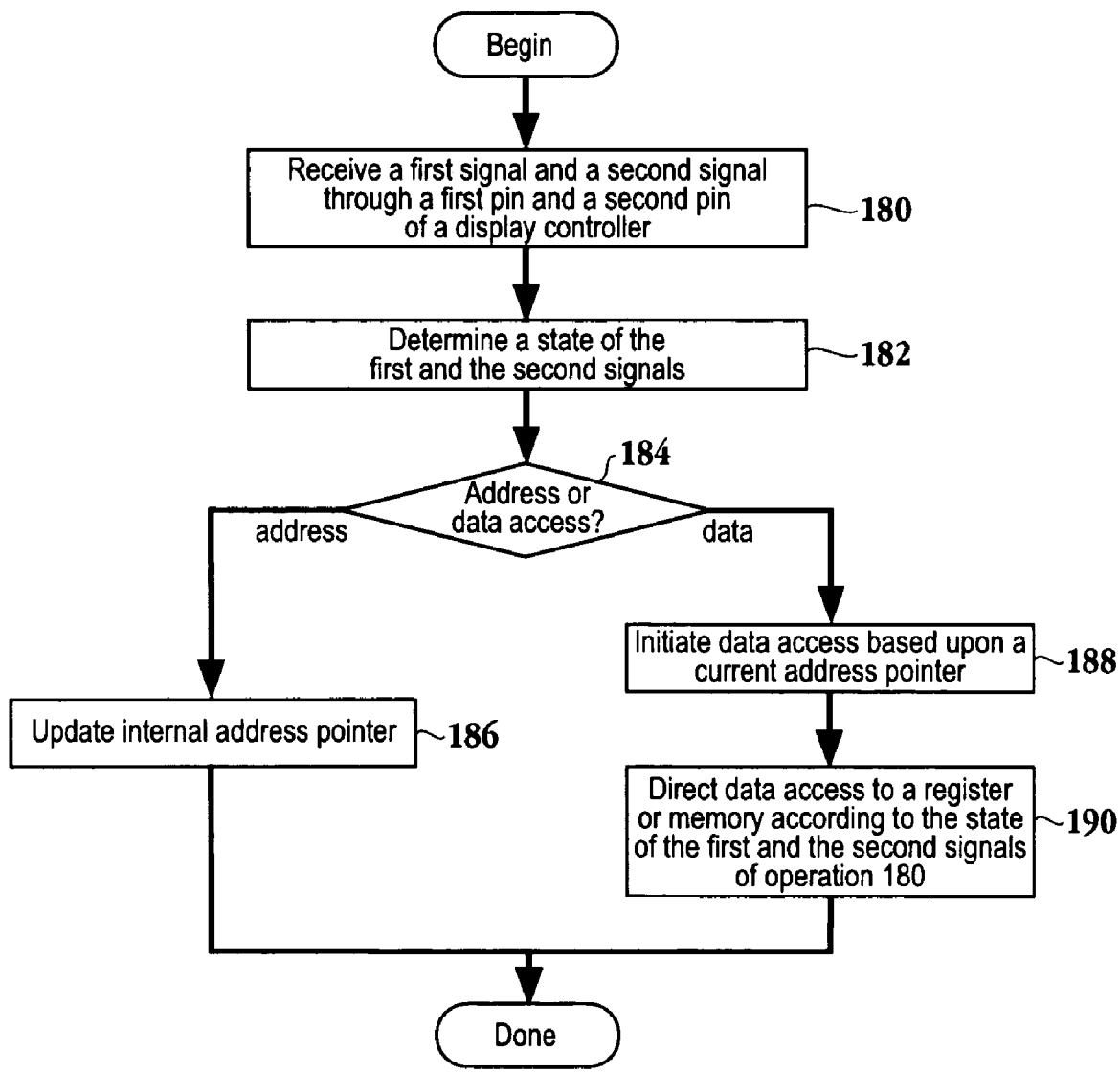
FIG. 7 is a flowchart illustrating the method operations for implementing an alternative indirect addressing mode to the method of FIG. 6.

FIG. 7 is a flowchart illustrating the method operations for implementing an alternative indirect addressing mode to the method of FIG. 6. The method initiates with receiving a first and a second signal in operation 180. In one embodiment, the first and the second signals are the chip select signal (CS#) and the memory chip select signal (MEMCS#), respectively, referred to in FIG. 4. Then, in operation 182 a state of the first and second signal is determined. For example, the state may be a logical high or a logical low state as depicted with reference to FIG. 4.

The method of FIG. 7 then advances to operation 184 where a selection between an address or data access is made through a third signal that is received through a third pin. The third signal is the A0 signal of FIG. 4 and toggles between an active high and an active low state to indicate address or data access, in one embodiment. If the third signal is at a state indicating an address access, then the method proceeds to operation 186 where an internal address pointer is updated. If the third signal is data then the method moves to operation 188 where a data access is initiated based upon a current address pointer. In operation 190, the data access is directed to either a register or memory based upon the state of the first and the second signals of operation 180. For example, if the chip select signal is active, then the data is directed to a register. If the memory chip select signal is active, then the data is directed to memory.

Figure 8:
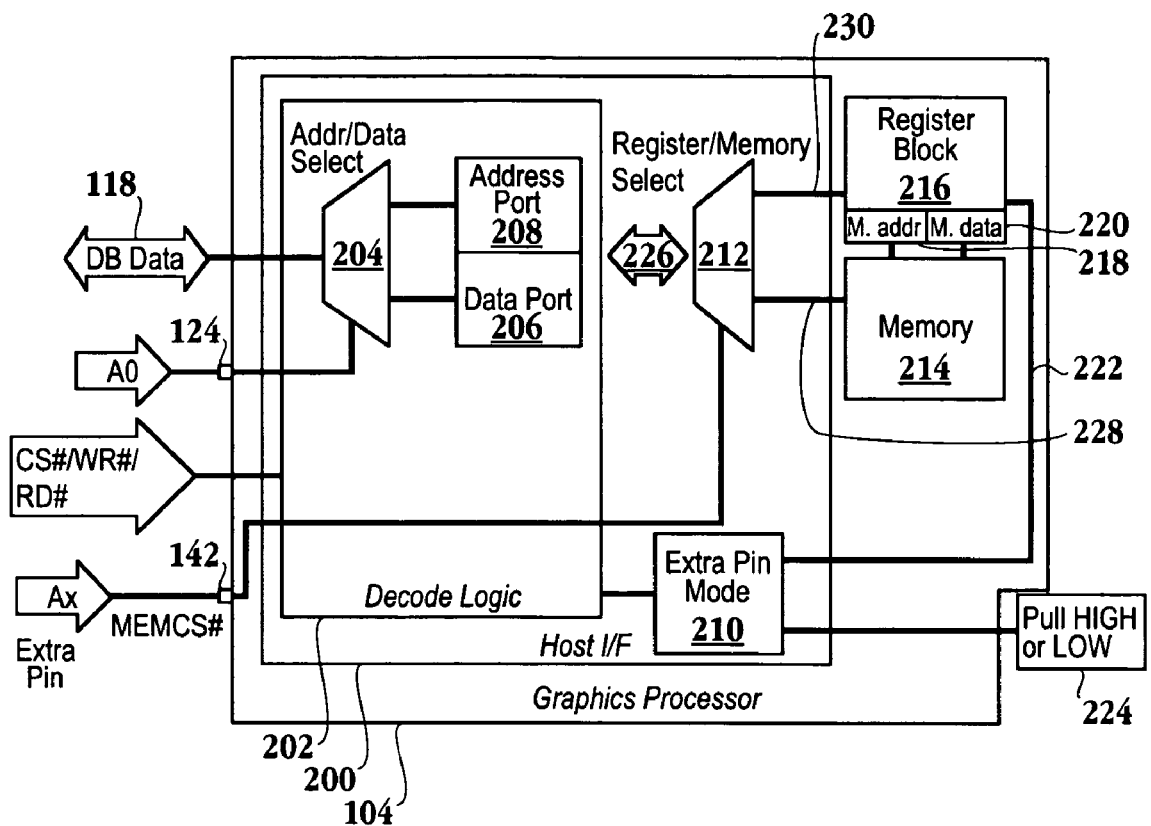
FIG. 8 is a simplified schematic diagram of the layout of a graphics processor accommodating the indirect addressing scheme utilizing an extra pin in accordance with one embodiment of the invention.

FIG. 8 is a simplified schematic diagram of the layout of a graphics processor accommodating the indirect addressing scheme utilizing the extra pin in accordance with one embodiment of the invention. Graphics processor 104 includes host interface 200. Host Interface 200 includes, decode logic 202, extra pin mode logic 210, and register/memory select multiplexor 212. Decode logic 202 includes address/data select multiplexor 204, address port 208 and data port 206. Signal A0 through pin 124 determines if the data on data bus 118 is address or data. Based on signal A0 the data is delivered to address port 208 or data port 206 from multiplexor 204. Inputs to graphics processor 104 include data over data bus 118, the address/data select signal through pin 124, and a memory chip select signal through pin 142. It should be appreciated that while the CS#, WR#, and RD# signals are grouped together for ease of explanation, each of the signals are associated with a corresponding pin as illustrated in FIGS. 1 and 2.

Extra pin mode module 210 represents a logical operation that is enabled based on a register bit from register block 216 over line 222 or external pull up or pull down pin 224. In essence, the register bit or external pull up or pull down pin 224 (also referred to as a configuration pin) enables register/memory select multiplexor 212 through decode logic 202. The path directly to memory, enabled through the extra pin, proceeds from data port 206 to multiplexor 212 over a path depicted by arrow 226 to memory 214 over line 228. Register block 216 includes memory address region 218 and memory data region 220. Thus, graphics processor 104 is configured to accommodate a traditional indirect addressing scheme as depicted in FIG. 3. For backward compatibility purposes line 228 would not be enabled when an extra pin is unavailable. Thus, all of the data proceeds through register block 216 over line 230, and then memory 214 is accessed through the register block.

In summary, an indirect addressing scheme requiring less bus cycles is provided. One skilled in the art will appreciate that an indirect addressing scheme for host interfaces provides a set of methods for specifying the indexing and accessing of an external device's internal features. Different peripheral devices vary greatly in the number of addressing modes they may provide. The most common modes are "register," i.e., the operand is stored in a specified register; "absolute," i.e., the operand is stored at a specified memory address; and "immediate," i.e., the operand is contained within the instruction. Most external devices also have indirect addressing modes where the specified address location is contained in the operand. Indirect addressing modes often have options for pre- or post-increment or decrement, meaning that the register or memory location containing the effective address is incremented or decremented by some amount (either fixed or also specified in the instruction), either before or after the instruction is executed, which are useful for accessing blocks of data.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The above described invention may be practiced with other computer system configurations including hand-held devices, microprocessor systems, microprocessor-based or programmable consumer electronics, minicomputers, mainframe computers and the like. Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

The invention claimed is:

1. A method for implementing an indirect addressing mode to access memory of a graphics processing unit (GPU), comprising method operations of:
   receiving a first signal through a first pin of the GPU, the first signal indicating selection of the GPU;
   receiving a second signal through a second pin of the GPU, the second signal indicating whether a memory access request for a memory region of the GPU without accessing a register block is enabled; and
   toggling a third signal communicated through a third pin between a first state and a second state, the first state representing address information being sent for the memory access and the second state representing data being sent for the memory access, wherein the data is sent to the memory without accessing a register block to set up the memory access when the third signal is at the second state and the second signal enables the memory access request.

2. The method of claim 1 wherein the first signal is a chip select signal.

3. The method of claim 1 wherein the second signal is a register/memory signal.

4. The method of claim 1 wherein the third signal is an index/data select signal.

5. The method of claim 1, wherein the method operation of toggling a third signal between a first state and a second state includes,
   driving the address information over a data bus when the third signal is in the first state and the second signal is at a logical low value; and driving the data over the data bus when the third signal is in the second state and the second signal is at a logical low value.

6. The method of claim 1, further comprising:
specifying a configuration of the third pin through one of a fourth pin of the GPU or a register bit.

7. The method of claim 1, wherein the toggling of the signal between the first state and the second state results in a selection of a corresponding data path to the memory.

8. A method for implementing an indirect addressing mode to access memory of a graphics processing unit (GPU), comprising method operations of:
receiving a first signal through a first pin of the GPU, the first signal indicating selection of the GPU;
receiving a second signal through a second pin of the GPU, the second signal indicating a memory access request for a memory region of the GPU; and
toggling a third signal communicated through a third pin between a first state and a second state, the first state representing address information being sent for the memory access and the second state representing data being sent for the memory access, wherein the first state and the second state differentiate between a data path to the memory without accessing a register block and a data path to the memory through the register block.

9. The method of claim 8, wherein the data path to the memory without accessing a register block and the data path to the memory through the register block are multiplexed together with the third signal acting as a select signal.

10. The method of claim 8, wherein the data path to the memory without accessing the register block is enabled for non-sequential accesses by maintaining the third signal at one of the first state or the second state.

* * * * *

UNITED STATES PATENT AND TRADEMARK OFFICE
CERTIFICATE OF CORRECTION

PATENT NO. : 7,352,372 B2  Page 1 of 1
APPLICATION NO. : 10/972020
DATED : April 1, 2008
INVENTOR(S) : Raymond Chow et al.

It is certified that error appears in the above-identified patent and that said Letters Patent is hereby corrected as shown below:

Title page,

Item [56], References Cited
U.S. PATENT DOCUMENTS
Please add --6,192,457 B1    2/2001    Porterfield--.

Signed and Sealed this

Twenty-second Day of July, 2008

JON W. DUDAS
*Director of the United States Patent and Trademark Office*